United States Patent
Ge et al.

(10) Patent No.: US 10,584,850 B2
(45) Date of Patent: Mar. 10, 2020

(54) OPTICAL REFLECTION FILMS

(71) Applicants: Arkema France, Colombes (FR); Jiaxin Jason Ge, Lower Providence, PA (US); Mark A. Aubart, West Chester, PA (US)

(72) Inventors: Jiaxin Jason Ge, Lower Providence, PA (US); Mark A. Aubart, West Chester, PA (US)

(73) Assignee: Arkema France, Colombes (FR)

( * ) Notice: Subject to any disclaimer, the term of this patent is extended or adjusted under 35 U.S.C. 154(b) by 365 days.

(21) Appl. No.: 14/403,646

(22) PCT Filed: Jun. 3, 2013

(86) PCT No.: PCT/US2013/043817
§ 371 (c)(1),
(2) Date: Nov. 25, 2014

(87) PCT Pub. No.: WO2013/184536
PCT Pub. Date: Dec. 12, 2013

(65) Prior Publication Data
US 2015/0103513 A1     Apr. 16, 2015

Related U.S. Application Data

(60) Provisional application No. 61/655,553, filed on Jun. 5, 2012.

(51) Int. Cl.
*F21V 7/22* (2018.01)
*G02B 5/02* (2006.01)
*C08J 7/04* (2020.01)
*B32B 27/30* (2006.01)
*B32B 27/36* (2006.01)
*B32B 27/20* (2006.01)
*B32B 27/08* (2006.01)
*B32B 15/08* (2006.01)
*B32B 27/22* (2006.01)
*B32B 27/32* (2006.01)
*B32B 15/18* (2006.01)
*C09D 133/12* (2006.01)
*G02F 1/1335* (2006.01)

(52) U.S. Cl.
CPC ............. *F21V 7/22* (2013.01); *B32B 15/08* (2013.01); *B32B 15/18* (2013.01); *B32B 27/08* (2013.01); *B32B 27/20* (2013.01); *B32B 27/22* (2013.01); *B32B 27/302* (2013.01); *B32B 27/308* (2013.01); *B32B 27/32* (2013.01); *B32B 27/36* (2013.01); *B32B 27/365* (2013.01); *C08J 7/047* (2013.01); *C09D 133/12* (2013.01); *G02B 5/0242* (2013.01); *G02B 5/0268* (2013.01); *G02B 5/0284* (2013.01); *G02F 1/133605* (2013.01); *B32B 2255/10* (2013.01); *B32B 2255/20* (2013.01); *B32B 2264/102* (2013.01); *B32B 2270/00* (2013.01); *B32B 2307/306* (2013.01); *B32B 2307/408* (2013.01); *B32B 2307/416* (2013.01); *B32B 2307/734* (2013.01); *B32B 2551/00* (2013.01); *C08J 2367/02* (2013.01); *C08J 2433/00* (2013.01); *Y10T 428/24967* (2015.01); *Y10T 428/266* (2015.01); *Y10T 428/269* (2015.01); *Y10T 428/31507* (2015.04); *Y10T 428/31699* (2015.04); *Y10T 428/31797* (2015.04); *Y10T 428/31913* (2015.04); *Y10T 428/31924* (2015.04); *Y10T 428/31928* (2015.04); *Y10T 428/31935* (2015.04)

(58) Field of Classification Search
CPC ....................................... F21V 7/22; F21V 7/28
See application file for complete search history.

(56) References Cited

U.S. PATENT DOCUMENTS

| | | | |
|---|---|---|---|
| 3,669,728 A | 6/1972 | Seiner | |
| 4,916,014 A | 4/1990 | Weber et al. | |
| 5,982,546 A | 11/1999 | Kawamoto et al. | |
| 5,991,080 A | 11/1999 | Kohta et al. | |
| 7,541,723 B2 | 6/2009 | Hayashi et al. | |
| 7,826,703 B2 * | 11/2010 | Iwasaki | G02B 6/0038 362/613 |
| 2004/0052079 A1 | 3/2004 | Nakano | |
| 2007/0037000 A1 | 2/2007 | Shih et al. | |
| 2008/0136998 A1 | 6/2008 | Sakata et al. | |
| 2008/0247175 A1 * | 10/2008 | Yoon | B32B 3/26 362/341 |
| 2009/0194320 A1 | 8/2009 | Okumura | |
| 2011/0146758 A1 | 6/2011 | Trouilhet et al. | |
| 2011/0232735 A1 | 9/2011 | Bizet et al. | |
| 2011/0315189 A1 * | 12/2011 | Ge | H01L 31/049 136/244 |
| 2012/0024353 A1 | 2/2012 | Ge et al. | |
| 2012/0262927 A1 * | 10/2012 | Lu | C08L 67/02 362/341 |

FOREIGN PATENT DOCUMENTS

| | | | | |
|---|---|---|---|---|
| JP | 2006339033 | 12/2006 | | |
| JP | 2007108242 | 4/2007 | | |
| WO | WO 2010101811 A1 * | 9/2010 | ............... | B32B 7/12 |

* cited by examiner

Primary Examiner — Sean P Gramling
(74) Attorney, Agent, or Firm — Thomas F. Roland

(57) ABSTRACT

Films useful as optical reflectors are prepared by coating a sheet of polyethylene terephthalate or other thermoplastic with acrylic polymer, white pigment, and optionally other additives such as impact modifiers, matting agents and UV stabilizers.

17 Claims, No Drawings

OPTICAL REFLECTION FILMS

This application claims benefit, under U.S.C. § 119 or § 365 of PCT Application Number PCT/US2013/043817, filed Jun. 3, 2013, and U.S. Provisional Application Number 61/655,553, filed Jun. 5, 2012.

FIELD OF THE INVENTION

The invention pertains to pigment-coated polymeric films useful as optical reflectors or optical reflection films.

DISCUSSION OF THE RELATED ART

Optical reflectors or optical reflection films have been widely used in LED-backlit units in liquid crystal displays (including handhelds, notebooks, desktop monitors and LCD TVs) and LED lighting fixture applications. Such optical reflectors or optical reflection films offer high optical reflectance in the visible wavelength region and excellent UV resistance. Traditionally, white optical reflectors have been made from metal (Ag, Al) deposited PET (polyethylene terephthalate) or white barium sulfate or CaCO3-pigmented polymer (such as PET, polycarbonate, polypropylene and polyethylene) films, which are not fully UV resistant. There has been an on-going need to develop improved optical reflectors or optical reflection films which fully meet the target performance requirements for such end use applications (e.g., high brightness, high diffused light scattering, excellent long-term UV resistance, excellent color retention (no yellowing), dimensional stability, heat resistance, excellent mechanical properties and environmental stability).

LED light sources offer much longer service life (up to 50,000-100,000 hrs) and high energy efficiency. From the LED light sources, the temperature could be as high as up to 105° C. Therefore, the polymer materials used in LED lighting units should have sufficient thermal stability to avoid any thermal deformation, including warping, when they are close to LED lamps. For the optical reflectors used in LED lighting and LED-backlight units, it is desired to have long-term excellent UV resistance, high optical reflectance (greater than 90% at 560 nm) in the visible light region, high diffused Lambertian light scattering, excellent thermal dimensional stability, and excellent environmental stability. For LED lighting and LED-backlit units, high light reflectance in films is required to improve the light brightness while the high diffused light scattering is desired to increase the light recycling and light uniformity.

BRIEF SUMMARY OF THE INVENTION

One aspect of the invention provides a film suitable for use as an optical reflector, the film comprises:
  a) a substrate film layer comprised of a thermoplastic polymer; and
  b) an acrylic coating on at least one side of the substrate film layer, wherein the acrylic coating is comprised of an acrylic polymer and a white pigment.

Another aspect of the invention provides a method of making a film suitable for use as an optical reflector. This method comprises applying an acrylic coating composition to at least one side of a substrate film layer comprised of a thermoplastic polymer, wherein the acrylic coating composition comprises an acrylic polymer, a volatile liquid medium for the acrylic polymer, and a white pigment. The acrylic coating composition on the substrate film layer is then dried of the volatile liquid medium.

Still further aspects of the invention provide an LED lighting unit comprising, as a back light reflector, a film comprised of a substrate film layer comprised of a thermoplastic polymer and an acrylic coating on at least one side of the substrate film layer, wherein the acrylic coating is comprised of an acrylic polymer and a white pigment, as well as a lighting device comprised of a light emitting diode and a film comprised of a substrate film layer comprised of a thermoplastic polymer and an acrylic coating on at least one side of the substrate film layer, wherein the acrylic coating is comprised of an acrylic polymer and a white pigment.

Films in accordance with the present invention may have one or more of the following advantages as compared to other materials known in the optical reflector or optical reflection film art: long-term UV resistance, excellent color retention (no yellowing), diffused light scattering, excellent thermal dimensional stability and/or heat resistance, excellent mechanical properties and environmental stability. The films of the present invention are capable of offering much better color retention and gloss retention than conventional optical reflectors made from extruded white PET, PEN and PETG films.

DETAILED DESCRIPTION OF THE INVENTION

The substrate film layer component used in the present invention may be comprised of any suitable thermoplastic polymer such as, for example, polyethylene terephthalate (PET), polyethylene naphthalate (PEN), PET-co-PEN, glycol-modified polyethylene terephthalate (PETG), PET-co-PETG, polycarbonate (PC), polymethyl methacrylate (PMMA), acrylonitrile-styrene-acrylate (ASA) copolymers, high-impact polystyrene (HIPS), acrylonitrile-butadiene-styrene (ABS) copolymers, polyolefins, and functional polyolefins. Any of the conventional thermoplastic additives such as stabilizers, fillers, pigments, plasticizers and the like may also be present in the substrate film layer, in addition to the thermoplastic polymer. The substrate film layer in various embodiments of the invention may be clear or opaque (e.g., white). Typically, the substrate film layer is in the form of a relatively thin, flat sheet or film of substantially uniform thickness. The thickness of the substrate film layer may, for example, be from 25 to 254 μm or from 50 to 125 μm. The substrate film layer may be a single unitary layer of a polymer or polymer blend or may contain two or more layers of different polymers or polymer blends.

The substrate layer may also be a metal sheet, including but not limited to aluminum, copper, and steel. The metal sheet may be treated, such as a zinc hot dip galvanized steel. The metal substrate has a thickness of from 0.2 to 1 mm.

To improve the adhesion of the acrylic coating, one or both sides of the substrate film layer may be primed. Suitable methods for treating the substrate film layer surface to enhance adhesion include corona or plasma treatment, silane treatment, application of an organic- or polymer-based primer coating, and the like.

The acrylic coating may be placed on one or both sides of the substrate film layer. Providing an acrylic coating on both sides of a clear substrate film layer has been found to provide further enhancement of the total optical reflectance. It is believed that the additional reflection from a second acrylic coating/substrate film layer interface is responsible for improving the total optical reflectance in the visible optical wavelength region as compared to a clear substrate film layer coated on one side only or as compared to a white substrate film layer coated on both sides.

If both sides are coated, the same acrylic coating may be employed on both sides or different acrylic coating compositions may be used. The acrylic coating is comprised of an acrylic polymer and a white pigment. The acrylic polymer may be any polymer containing recurring units of acrylic monomers and generally is a thermoplastic (although crosslinked acrylic polymers may also be utilized). The acrylic polymer may, for example, have a linear, branched or grafted structure. Suitable acrylic monomers include any of the polymerizable acrylate and methacrylate monomers known in the art. Examples of acrylic monomers include acrylic acid, methacrylic acid, and esters of acrylic and methacrylic acid such as $C_1$-$C_6$ alkyl esters of (meth)acrylic acid (e.g., methyl methacrylate, methyl acrylate, ethyl acrylate, ethyl methacrylate, n-butyl acrylate, n-butyl methacrylate and the like. The acrylic monomers may be homopolymerized or copolymerized. Acrylic copolymers include both polymers wherein two or more different acrylic monomers are copolymerized as well as polymers wherein an acrylic monomer (or mixture of acrylic monomers) is copolymerized with one or more non-acrylic monomers such as a vinyl aromatic monomer (e.g., styrene), an olefin (e.g., ethylene), (meth) acrylonitrile, a vinyl monomer, or the like.

In one embodiment of the invention, the monomer(s) used to prepare the acrylic polymer are selected such that the resulting polymer has a relatively high glass transition temperature (Tg). For example, the acrylic polymer have a Tg of at least 80° C., at least 85° C., at least 90° C., at least 95° C., at least 100° C., at least 105° C., at least 110° C., at least 115° C., at least 120° C., or at least 125° C. In another embodiment, the acrylic polymer used has a relatively low Tg. Such a low Tg acrylic polymer may, however, be crosslinked and then used in the coating compositions of the present invention. The Tg of a polymer may be measured by differential scanning calorimetry during the second heating cycle using a heating rate of 10° C./min.

The term "polymer" as used herein means both homopolymers and copolymers. The term "copolymer" as used herein means a polymer having two or more different monomer units. The copolymer could be a terpolymer with three or more different monomer units, or have four or more different monomer units. The copolymer may be a random copolymer, a gradient copolymer, or could be a block copolymer formed by a controlled polymerization process. The copolymer could also be a graft copolymer, or have a controlled structure such as a star or comb. In one embodiment, the acrylic polymer is formed by a free radical polymerization process, and the process can be any polymerization method known in the art, including but not limited to emulsion, solution, suspension polymerization, and can be done in bulk, semi-bulk or delayed feed.

In one embodiment, the acrylic polymer is a copolymer which contains at least 50 weight percent of methylmethacrylate monomer units, and preferably at least 75 weight percent and more preferably at least 85 weight percent methylmethacrylate monomer units. The copolymer in this embodiment contains from 1 to just less than 50, preferably 2 to 25, and more preferably 5 to 15 weight percent of at least one higher Tg monomer (high Tg monomer as used herein means the Tg of the homopolymer of that monomer). The Tg of the high Tg monomer may be, for example, at least 120° C. or at least 125° C. Useful high Tg monomers include, but are not limited to, methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide, and methacrylamide.

The acrylic copolymer may contain one or more other vinyl monomers copolymerizable with methyl methacrylate, including but not limited to other acrylate and methacrylate monomers or other ethylenically unsaturated monomers, included but not limited to, styrene, alpha methyl styrene, and acrylonitrile. Crosslinkers may also be present in the monomer mixture. Other methacrylate and acrylate monomers useful in the monomer mixture include, but are not limited to, methyl acrylate, ethyl acrylate and ethyl methacrylate, butyl acrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers.

In one embodiment, the acrylic copolymer contains an acid functional monomer such as acrylic acid, methacrylic acid, maleic acid, itaconic acid, or other alpha-beta unsaturated carboxylic acid monomers. The acid functional monomer content of the copolymer may be, for example, 2 to 8 or 3 to 6 weight %. In one embodiment, the balance of the copolymer may be methyl methacrylate or a monomer mixture comprised of methyl methacrylate and at least one other monomer selected from ethyl acrylate, methyl acrylate or butyl acrylate. For example, the copolymer may comprise 2 to 8 weight % acid functional monomer and 0 to 10 weight % of one or more monomers selected from ethyl acrylate, methyl acrylate and butyl acrylate, with the balance (to 100 weight %) being methyl methacrylate.

If the acrylic polymer is a copolymer, the copolymer may be, for example, a random copolymer, a block copolymer, or a graft copolymer.

The acrylic polymer may, in one embodiment of the invention be impact-modified. That is, the acrylic coating may comprise one or more impact modifiers in addition to the acrylic polymer and the white pigment. The impact modifier may be prepared or obtained separately from the acrylic modifier and then combined with the acrylic polymer to prepare the composition used to make the acrylic coating, or the acrylic polymer may be impact-modified during its preparation. Any of the impact modifiers known in the acrylic resin art may be employed for this purposes including, for example, block copolymers, random copolymers, graft copolymers, homopolymers, core-shell impact modifiers and the like. Typically, the impact modifier will either be rubbery (elastomeric) having a Tg below 20° C. or below 0° C. or contain at least one phase or segment that is rubbery and has a Tg below 20° C. or below 0° C.

In certain embodiments, the impact modifiers are core-shell multi-layer polymers and/or block copolymers having at least one hard and at least one soft block. The core-shell (multi-layer) impact modifiers could have a soft (rubber or elastomer) core and a hard shell, a hard core covered with a soft elastomer layer and then a hard shell, or other core-shell morphology known in the art. The rubber layers are composed of low glass transition (Tg) polymers, including, but not limited to, polymers of butyl acrylate (BA), ethylhexyl acrylate (EHA), butadiene (BD), butylacrylate/styrene, siloxane and many other combinations. The elastomeric or rubber layer may be crosslinked by a multifunctional monomer for improved energy absorption. Crosslinking monomers suitable for use as the crosslinker in the core-shell impact modifier are well known to those skilled in the art, and are generally monomers copolymerizable with the monounsaturated monomer present, and having ethylenically multifunctional groups that have approximately equal reactivity. Examples include, but are not limited to, divinylbenzene, glycol of di- and trimethacrylates and acrylates, triol triacrylates, methacrylates, and allyl methacrylates, etc. A grafting monomer may also be used to enhance the interlayer grafting of impact modifiers and the matrix/modifier particle grafting. The grafting monomers can be any polyfunctional crosslinking monomers.

For soft core multi-layered impact modifiers, the core may comprise from 30 to 85 percent by weight of the impact modifier and the outer shells may comprise from 15 to 70 weight percent of the impact modifier. The crosslinker in the elastomeric layer may range from 0 to 5.0% by weight.

If impact modifier is present in the acrylic coating, it may comprise, for example, up to 30% by weight of the acrylic coating. For example, the impact modifier content of the acrylic coating may be 5 to 25 weight % or 8 to 20 weight %. In one embodiment, the weight ratio of acrylic resin: impact modifier is from 2:1 to 5:1. As used herein, all references to "X % by weight of the acrylic coating" or the like shall be understood to mean % by weight based on the weight of the final, dry coating that is present on the substrate film layer.

The acrylic coating further contains one or more white pigments. Typically, suitable pigments are particulate in form having, for example, average particle sizes of from 50 to 400 nm or 100 to 300 nm. Larger particle size pigments may also be employed; as the average particle size increases, the pigment may impart a matting effect to the acrylic coating (i.e., reduce the surface gloss), which may be advantageous in certain applications. Suitable white pigments include, but are not limited to, zinc oxide, PdS, titanium dioxide and barium sulfate. The titanium dioxide may be rutile titanium dioxide produced by the chloride process. The pigment may also be a powder formed from organic or inorganic materials, such as glass beads or polymers. These materials could appear clear as a unit, however when reduced to powder form would appear white. The pigment may be treated with an organic-based material to improve bulk flow and processing. The white pigment content of the acrylic coating is generally at least 35 weight %, at least 45 weight %, at least 55 weight % or at least 65 weight %. Typically, the acrylic coating does not contain more than 90 weight %, more than 85 weight %, or more than 80 weight % white pigment.

In addition to the white pigment, the acrylic coating may contain one or more matting agents which serve to promote diffused light scattering (in the bulk and on the surface) for better light uniformity in the coated films of the present invention. The matting agents are generally particulate and may, for example, be relatively large particles of inorganic substances (e.g., barium sulfate, metal oxides such as alumina and silicon oxides) or organic substances (e.g., Paraloid® EXL5136, Orgasol® polyamide porous particles, Celocor® hollow particles, fluorohomopolymers and fluorocopolymers such as polyvinylidene fluoride or vinylidene fluoride/hexafluoropropylene copolymers). The matting agent content of the acrylic coating may be, for example, up to 20 weight % (e.g., 1 to 15 weight %). In one embodiment, an amount of matting agent is present in the acrylic coating which is effective to provide a surface gloss at a measuring angle of 60 degrees of less than 10 GU (e.g., 4-9 GU).

Additionally, the acrylic coating may contain one or more UV stabilizers, antioxidants and/or processing additives, typically at levels of 0.5 to 5 weight %.

The components of the acrylic coating may be selected so as to provide an optical reflectance in the finished film of at least 90%, at least 96% or at least 98% at 560 nm.

The acrylic coating may be placed on one or both sides of the substrate film layer, with a primer coat optionally being present between the acrylic coating and the surface of the substrate film layer. Typically, the acrylic coating is 20 µm to 70 µm or 30 µm to 50 µm in thickness. Generally speaking, the acrylic coating is substantially uniform in thickness and extends over the entire surface of the substrate film layer.

To prepare films in accordance with the invention, the following procedure may be used. If the acrylic coating is to contain a stabilizer, matting agent and/or an impact modifier, such optional substances may be first compounded with the acrylic polymer using any suitable technique such as extrusion. For example, the initial components may be compounded in a twin screw extruder at an elevated temperature (e.g., 200° C. to 260° C.) and extruded through a die to form pellets. The pellets may be dried and then dissolved in a suitable solvent or mixture of solvents. Suitable solvents may include, for example ketones (e.g., methyl ethyl ketone, methyl isobutyl ketone), esters (butyl acetate) and mixtures thereof. In an alternative embodiment, the acrylic polymer may be provided in the form of an aqueous dispersion or emulsion, wherein particles of the acrylic polymer are suspended in water or a mixture of water and an organic solvent miscible with water which is a non-solvent for the acrylic polymer (possibly with one or more surfactants or emulsifying agents also being present, in order to keep the acrylic polymer particles dispersed or suspended). Thus, the coating composition may be comprised of a volatile liquid medium for the acrylic polymer, wherein the volatile liquid medium is water or a volatile organic solvent.

The white pigment may thereafter be combined with the acrylic polymer/volatile liquid medium mixture to provide a suspension (sometimes referred to herein as an "acrylic coating composition"). The pigment may be dispersed into the acrylic polymer/volatile liquid medium mixture using mechanical shearing.

A suitable substrate film layer is selected and coated with a layer of the acrylic coating composition on at least one side. The surface to be coated may have first been primed. Coating may be carried out using any suitable method known in the art for coating polymeric film substrates, such as through the use of a bar coater, slot die, gravure, reverse gravure or the like. Generally, it will be desirable to apply a substantially uniform layer of the acrylic coating composition, typically having a thickness sufficient, when dried, to provide an acrylic coating layer of from 20 to 70 µm in thickness. The coating of acrylic coating composition is then dried, by heating (e.g., at 50° C. to 160° C.) or other means, to remove the volatile liquid medium present. If both sides of the substrate film layer, each side may be coated and dried successively or both sides may be coated and dried simultaneously. The acrylic coating compositions applied to each side may be the same as or different from each other. The coated, dried film may thereafter be cut or otherwise fabricated to have the dimensions or configuration suitable for use in an LED lighting fixture or LED backlit unit.

Optical reflectors in accordance with the present invention can be used in LED lighting and LED backlit units for applications in handheld devices, notebooks, desktop monitors, LCD TVs, and the like. For example, the optical reflector is suitable for improving the light brightness and light uniformity in lighting sources like LED and cold-cathode fluorescent lamp (CCFL). The white optical reflector can be located behind a light guide panel in a backlight unit and/or be used as a light bulb reflector. The optical reflector can be used in white LED lighting with improved brightness and energy savings.

EXAMPLES

Example 1

High Tg acid-functional acrylic Plexiglas® resins (Tg=124° C.) made at Arkema were compounded with core-shell impact modifiers having a particle size of 250-300 nm to form impact acrylic resins using a twin-screw extruder at a die temperature of 250° C. UV stabilizer was also added into the formulation during the compounding. The compounded acrylic pellets were dried at 70° C. They were then dissolved in a mixture of MEK/butyl acetate (10/1) to form a uniform polymer solution over a roller mixer at room temperature overnight. $TiO_2$ TI-PURE® R-105 pigment particles from Du Pont were directly dispersed into the coating suspension with a shear mixer.

The white pigmented coating solution was applied to a primed PET (Skyrol® SH81, supplied by SKC Inc.; 100 μm thickness) substrate, using a bar coating station after the filtration (50 μm coating thickness). The coating layer was dried at 75° C. for minutes and 125° C. for 2 minutes. The acrylic coated PET sheet formed at a coating thickness of 50 μm. The coating solution was also applied to the backside of the sheet to form a double-sided acrylic coated sheet under the same conditions. The adhesion of acrylic layers to the primed PET was excellent (5B) using a standard X-hatch peel-off adhesion test (ATSM D3002/3359). The thermal shrinkage was less than 1.0% at 150° C. for 30 minutes along the MD and TD directions. The optical reflectance at 560 nm was measured at 97.1% using Perkin Elmer Lambda 950 with 150 mm integrating sphere. The surface gloss at the setting angle of 60° was measured at 20 GU.

TABLE 1

| Example 1 | Suppliers | Amount (gm) |
|---|---|---|
| Acrylic | Arkema | 78 |
| Core Shell Impact Modifier | Arkema | 22 |
| $TiO_2$ TI-PURE ® R-105 | Du Pont | 167 |
| Tinuvin ® 234 | Ciba | 2.0 |
| Irganox ® 1010 | Ciba | 0.35 |
| Irgafos ® 126 | Ciba | 0.15 |
| MEK | Aldrich | 300 |
| Butyl acetate | Aldrich | 30 |

Example 2

High Tg acid-functional acrylic Plexiglas® resins (Tg=124° C.) made at Arkema were compounded with core-shell impact modifiers and Kynar® Flex 3120-10 resin to form impact acrylic resins using a twin-screw extruder at a die temperature of 240-250° C. UV stabilizer was also added into the formulation during the compounding. The compounded acrylic pellets were dried at 70° C. They were then dissolved in a mixture of MEK/MIBK (60/10) to form a uniform polymer solution on a hot stage at 50° C. $TiO_2$ TI-PURE R-105 pigment particles from Du Pont were directly dispersed into the coating suspension with a shear mixer at room temperature.

The white pigmented coating solution was applied to a primed PET (100 μm thick, Melinex® 454-400 supplied by Du Pont-Teijin) film substrate using a bar coating station after the filtration. The coating layer was dried at 75° C. for 5 minutes and 130° C. for 2 minutes. The acrylic coated PET sheet formed at a coating thickness of 50 μm. The coating solution was also applied to the backside of the sheet to form a double-sided acrylic coated sheet under the same conditions. The adhesion of the acrylic layers to the primed PET was excellent. The thermal shrinkage was less than 1.0% at 150° C. for 30 minutes along the MD and TD directions. The optical reflectance at 560 nm was measured at 97.1%. The surface gloss at 60° setting was measured at 6-8 GU.

TABLE 2

| Example 2 | Suppliers | Amount (gm) |
|---|---|---|
| Acrylic Resin | Arkema | 70 |
| Core-Shell Impact Modifier | Arkema | 21 |
| Kynar ® Flex 3120 | Arkema | 9 |
| $TiO_2$ TI-PURE R-105 Pigment | Du Pont | 190 |
| Tinuvin ® 234 | Ciba | 1.5 |
| Irganox ® 1010 | Ciba | 0.25 |
| Irgafos ® 126 | Ciba | 0.25 |
| MEK | Aldrich | 300 |
| MIBK | Aldrich | 50 |

Example 3

High Tg acid-functional acrylic Plexiglas® resins (Tg=125° C.) made at Arkema were compounded with core-shell impact modifier and Kynar® 741 powder resin to form impact acrylic resins using a twin-screw extruder at a die temperature of 250° C. UV stabilizer was also added into the formulation during the compounding. The compounded acrylic pellets containing Kynar® 741 were dried at 70° C. They were then dissolved in a MEK/MIBK (60/10) mixture to form a uniform polymer solution on a hot stage at 50° C. $TiO_2$ TI-PURE R-105 pigment particles from Du Pont were directly dispersed into the coating suspension with a shear mixer.

The white pigmented coating solution was further applied to a primed Melinex® 454-300 (75 μm, Du Pont-Teijin) PET substrate using a bar coating station. The coating layer was dried at 75° C. for 5 minutes and 135° C. for 2 minutes in a ventilation oven. The acrylic layer formed over the sheet at a coating thickness of 50 μm. The same coating solution was also applied to the backside of the double-sided acrylic coated sheet under the same conditions. The adhesion of the acrylic layers to the primed PET film was excellent. The thermal shrinkage was less than 1.0% at 150° C. for 30 minutes along the MD and TD directions. The optical reflectance at 560 nm was measured at 97.1%. The surface gloss at 60° was reduced to 4.5-6 GU.

TABLE 3

| Example 3 | Suppliers | Amount (gm) |
|---|---|---|
| Acrylic Resin | Arkema | 71 |
| Core-Shell Impact Modifier | Arkema | 20 |
| Kynar ® 741 | Arkema | 9 |
| $TiO_2$ TI-PURE R-105 Pigment | DuPont | 185 |
| Tinuvin ® 234 | Ciba | 1.5 |
| Irganox ® 1010 | Ciba | 0.35 |
| Irgafos ® 126 | Ciba | 0.15 |
| MEK | Aldrich | 300 |
| MIBK | Aldrich | 50 |

Example 4

High Tg acid-functional acrylic Plexiglas® resins (Tg=125° C.) made at Arkema were compounded with core-shell impact modifiers having a particle size of 250-300 nm to form impact acrylic resins using a twin-screw extruder at a die temperature of 250° C. UV stabilizer was also added into the formulation during the compounding. The compounded acrylic pellets were dried at 70° C. They were then dissolved in a MEK/MIBK (90/10) mixture to form a uniform polymer solution on a roller mixer at room temperature overnight. $TiO_2$ TI-PURE R-105 pigment particles from Du Pont and $BaSO_4$ particles (BF-grade, having a particle size of ~700 nm) from Cimbar were directly dispersed into the coating suspension with a shear mixer.

The white pigmented coating solution was further applied to a primed Skyrol® SH81 (100 μm, SKC Inc.) PET film substrate using a bar coating station. The coating layer was dried at 75° C. for 5 minutes and 135° C. for 2 minutes in a ventilation oven. The acrylic layer formed over the sheet at a coating thickness of 45 μm. The same coating solution was also applied to the backside of the double-sided acrylic coated sheet under the same conditions. The adhesion of the acrylic layers to the primed PET was excellent. The thermal shrinkage was less than 1.0% at 150° C. for 30 minutes along the MD and TD directions. The optical reflectance at 560 nm was measured at 97.0%. The surface gloss at 60° was reduced to ~9 GU.

TABLE 4

| Example 4 | Suppliers | Amount (gm) |
| --- | --- | --- |
| Acrylic Resin | Arkema | 76 |
| Core-Shell Impact Modifier | Arkema | 24 |
| $TiO_2$ TI-PURE R-105 Pigment | Du Pont | 185 |
| $BaSO_4$ BF-grade | Cimbar | 20 |
| Tinuvin ® 234 | Ciba | 1.5 |
| Irganox ® 1010 | Ciba | 0.30 |
| Irgafos ® 126 | Ciba | 0.20 |
| MEK | Aldrich | 360 |
| MIBK | Aldrich | 40 |

Example 5

High Tg acid-functional acrylic Plexiglas® resins (Tg=124° C.) made at Arkema were compounded with core-shell impact modifiers to form impact acrylic resins using a twin-screw extruder at a die temperature of 250° C. UV stabilizer was also added into the formulation during the compounding. The compounded acrylic pellets were dried at 70° C. They were then dissolved in a MEK/MIBK (90/10) mixture to form a uniform polymer solution on a roller mixer at room temperature overnight. $TiO_2$ TI-PURE R-105 pigment particles from Du Pont were directly dispersed into the coating suspension with a shear mixer at room temperature.

The white pigmented coating solution was further applied to a primed (125 μm) Skyrol® SH82 PET film substrate using a bar coating station. The coating layer was dried at 75° C. for 5 minutes and 135° C. for 2 minutes in a ventilation oven. The acrylic layer formed over the sheet at a coating thickness of 50 μm. The same coating solution was also applied to the backside of the double-sided acrylic coated sheet under the same conditions. The adhesion of the acrylic layers to the primed PET film was excellent. The thermal shrinkage was less than 1.0% at 150° C. for 30 minutes along the MD and TD directions. The optical reflectance at 560 nm was measured at 97.3%. The surface gloss at 60° was reduced to 15 GU.

TABLE 5

| Example 5 | Suppliers | Amount (gm) |
| --- | --- | --- |
| Acrylic Resin | Arkema | 76 |
| Core-Shell Impact Modifier | Arkema | 24 |
| $TiO_2$ TI-PURE R-105 Pigment | Du Pont | 210 |
| Tinuvin ® 234 | Ciba | 2 |
| Irganox ® 1010 | Ciba | 0.35 |
| Irgafos ® 126 | Ciba | 0.15 |
| MEK | Aldrich | 360 |
| MIBK | Aldrich | 40 |

Example 6

High Tg acid-functional acrylic Plexiglas® resins (Tg=125° C.) made at Arkema were compounded with core-shell impact modifiers having a particle size of 250-300 nm to form impact acrylic resins using a twin-screw extruder at a die temperature of 250° C. UV stabilizer was also added into the formulation during the compounding. The compounded acrylic pellets were dried at 70° C. They were then dissolved in a MEK/MIBK (90/10) mixture to form a uniform polymer solution on a roller mixer at room temperature overnight. $TiO_2$ TI-PURE R-105 pigment particles from Du Pont were directly dispersed into the coating suspension with a shear mixer at room temperature.

The white pigmented coating solution was further applied to a primed Melinex® 454-300 (75 μm, Du Pont-Teijin) PET film substrate using a bar coating station. The coating layer was dried at 75° C. for 5 minutes and 125° C. for 2 minutes in a ventilation oven. The acrylic layer formed over the sheet at a coating thickness of 40 μm. The same coating solution was also applied to the backside of the double-sided acrylic coated sheet under the same conditions. The adhesion of the acrylic layers to the primed PET film was excellent. The thermal shrinkage was less than 1.0% at 150° C. for 30 minutes along the MD and TD directions. The optical reflectance at 560 nm was measured at 96.5%. The surface gloss at 60° was reduced to 17 GU.

TABLE 6

| Example 6 | Suppliers | Amount (gm) |
| --- | --- | --- |
| Acrylic Resin | Arkema | 76 |
| Core-Shell Impact Modifier | Arkema | 24 |
| $TiO_2$ TI-PURE R-105 Pigment | Du Pont | 185 |
| Tinuvin ® 234 | Ciba | 2.0 |
| Irganox ® 1010 | Ciba | 0.30 |
| Irgafos ® 126 | Ciba | 0.20 |
| MEK | Aldrich | 360 |
| MIBK | Aldrich | 40 |

Example 7

High Tg acid-functional acrylic Plexiglas® resins (Tg=125° C.) made at Arkema were compounded with core-shell impact modifiers having a particle size of 250-300 nm to form impact acrylic resins using a twin-screw extruder at a die temperature of 250° C. UV stabilizer was also added into the formulation during the compounding. The compounded acrylic pellets were dried at 70° C. They were then dissolved in a MEK/MIBK (95/1) mixture to form a uniform polymer solution on a roller mixer at room temperature overnight. 5 um 2001NAT1 UD Orgasol® polyamide particles (from Arkema) and $TiO_2$ TI-PURE R-105 pigment particles (from Du Pont) were directly dispersed into the coating suspension with a shear mixer.

The white pigmented coating solution was further applied to a primed Melinex® 454-300 (75 μm, Du Pont-Teijin) PET film substrate using a bar coating station. The coating layer was dried at 75° C. for 5 minutes and 125° C. for 2 minutes in a ventilation oven. The acrylic layer formed over the sheet at a coating thickness of 50 μm. The same coating solution was also applied to the backside of the double-sided acrylic coated sheet under the same conditions. The adhesion of the acrylic layers to the primed PET film was excellent. The thermal shrinkage was less than 1.0% at 150° C. for 30 minutes along the MD and TD directions. The optical reflectance at 560 nm was measured at 97.2%. The surface gloss at 60° was reduced to 5-7 GU.

TABLE 7

| Example 7 | Suppliers | Amount (gm) |
| --- | --- | --- |
| Acrylic Resin | Arkema | 76 |
| Core-Shell Impact Modifier | Arkema | 24 |
| Orgasol ® 5 um 2001NAT1 UD particle | Arkema | 15 |
| TiO$_2$ TI-PURE R-105 Pigment | Du Pont | 200 |
| Tinuvin ® 234 | Ciba | 1.5 |
| Irganox ® 1010 | Ciba | 0.30 |
| Irgafos ® 126 | Ciba | 0.20 |
| MEK | Aldrich | 300 |
| MIBK | Aldrich | 60 |

Example 8

High Tg acid-functional acrylic Plexiglas® resins (Tg=125° C.) made at Arkema were compounded with core-shell impact modifiers to form impact acrylic resins using a twin-screw extruder at a die temperature of 250° C. UV stabilizer was also added into the formulation during the compounding. The compounded acrylic pellets were dried at 70° C. They were then dissolved in a MEK/MIBK (50/10) mixture to form a uniform polymer solution on a hot stage at 50° C. 10 um 2001 NAT1 EXD Orgasol® polyamide particles (from Arkema) and TiO$_2$ TI-PURE R-105 pigment particles were directly dispersed into the coating suspension with a shear mixer.

The white pigmented coating solution was applied to a primed PET Melinex®454-300 (75 μm, Du Pont-Teijin) substrate using a bar coating station. The coating layer was dried at 75° C. for 5 minutes and 125° C. for 2 minutes. The acrylic-coated PET sheet formed at a coating thickness of 40 μm. The coating solution was also applied to the backside of the sheet to form a double-sided acrylic coated sheet. The adhesion of acrylic layers to the primed PET was excellent using a standard X-hatch peel-off test. The thermal shrinkage was less than 1.0% at 150° C. for 30 minutes along the MD and TD directions. The optical reflectance at 560 nm was measured at 96.7%. The surface gloss at 60° setting was measured at 6-8 GU.

TABLE 8

| Example 8 | Suppliers | Amount (gm) |
| --- | --- | --- |
| Acrylic Resin | Arkema | 70 |
| Core-Shell Impact Modifier | Arkema | 30 |
| Orgasol ® 10 um 2001NAT1 EXD particle | Arkema | 10 |
| TiO$_2$ TI-PURE R-105 Pigment | Du Pont | 195 |
| Tinuvin ® 234 | Ciba | 2 |
| Irganox ® 1010 | Ciba | 0.35 |
| Irgafos ® 126 | Ciba | 0.15 |

TABLE 8-continued

| Example 8 | Suppliers | Amount (gm) |
| --- | --- | --- |
| MEK | Aldrich | 300 |
| MIBK | Aldrich | 60 |

Example 9

High Tg acid-functional acrylic Plexiglas® resins (Tg=125° C.) made at Arkema were compounded with core-shell impact modifiers to form impact acrylic resins using a twin-screw extruder at the die temperature of 250° C. UV stabilizer was also added into the formulation during the compounding. The compounded acrylic pellets were dried at 70° C. They were then dissolved in a MEK/MIBK (90/10) mixture to form a uniform polymer solution on a hot stage at 50° C. TiO$_2$ TI-PURE R-105 pigment particles from Du Pont were directly dispersed into the coating suspension with a shear mixer.

The white pigmented coating solution was applied to a clear primed PET (75 μm, Melinex® 454-300, supplied by DuPont.) substrate using a bar coating station. The coating layer was dried at 75° C. for 5 minutes and 130° C. for 2 minutes in a ventilation oven. The acrylic layer formed at the coating thickness of 50 μm. The same coating solution was also applied to the backside of the acrylic coated sheet under the same conditions. The adhesion of acrylic layers to the primed PET was excellent. The thermal shrinkage was less than 0.8% at 150° C. for 30 minutes along the MD and TD directions. The optical reflectance at 560 m was measured at 97.1%. The surface gloss at 60° was reduced to 12 GU.

TABLE 9

| Example 9 | Suppliers | Amount (gm) |
| --- | --- | --- |
| Acrylic Resin | Arkema | 71 |
| Core-Shell Impact Modifier | Arkema | 29 |
| BaSO4, BF grade | Cimbar | 18 |
| TiO$_2$ TI-PURE R-105 Pigment | Du Pont | 200 |
| Tinuvin ® 234 | Ciba | 2 |
| Irganox ® 1010 | Ciba | 0.35 |
| Irgafos ® 126 | Ciba | 0.15 |
| MEK | Aldrich | 360 |
| MIBK | Aldrich | 40 |

Example 10

High Tg acid-functional acrylic Plexiglas® resins (Tg=125° C.) and Kynar® 740 made at Arkema were compounded with core-shell impact modifiers having a particle size of 250-300 nm to form impact acrylic resins using a twin-screw extruder at a die temperature of 250° C. UV stabilizer was also added into the formulation during the compounding. The compounded acrylic pellets were dried at 70° C. They were then dissolved in a MEK/MIBK (90/10) mixture to form a uniform polymer solution on a roller mixer at room temperature overnight. TiO$_2$ TI-PURE R-105 pigment particles from Du Pont were directly dispersed into the coating suspension with a shear mixer.

A Melinex® 329/500 white PET (125 μm, Du Pont-Teijin) film was corona-treated up to 60 dynes/cm and primed with Dow Chemical Z-6137 silane at a concentration of 2 wt. % and dried at 80° C. for 10 minutes. The white pigmented coating solution was applied to the 125 μm white PET (Mexlinex® 329) film using a bar coating station. The coating layer was dried at 75° C. for 5 minutes and 125° C. for 2 minutes in a ventilation oven. The acrylic layer formed over the sheet at a coating thickness of 45 µm. The same coating solution was also applied to the backside of the double-sided acrylic coated sheet under the same conditions. The adhesion of acrylic layers to the silane-primed PET was excellent using a standard cross-hatch peel-off adhesion test. The thermal shrinkage was less than 1.1% at 150° C. for 30 minutes along the MD and TD directions. The optical reflectance at 560 nm was measured at 97.2%. The surface gloss at 60° was reduced to 4-6 GU.

TABLE 10

| Example 10 | Suppliers | Amount (gm) |
| --- | --- | --- |
| Acrylic Resin | Arkema | 71 |
| Core-Shell Impact Modifier | Arkema | 20 |
| Kynar 740 | Arkema | 9 |
| TiO₂ TI-PURE R-105 Pigment | Du Pont | 195 |
| Tinuvin ® 234 | Ciba | 2.0 |
| Irganox ® 1010 | Ciba | 0.30 |
| Irgafos ® 126 | Ciba | 0.20 |
| MEK | Aldrich | 360 |
| MIBK | Aldrich | 40 |

Example 11

High Tg acid-functional acrylic Plexiglas® HT121 resins (Tg=125° C.) made at Arkema were compounded with core-shell impact modifiers having a particle size of 250-300 nm to form impact acrylic resins using a twin-screw extruder at the die temperature of 250° C. UV stabilizer was also added into the formulation during the compounding. The compounded acrylic pellets were dried at 70° C. They were then dissolved in a MEK/MIBK (90/10) mixture to form a uniform polymer solution on a roller mixer at room temperature overnight. TiO₂ TI-PURE R-105 pigment particles from Du Pont were directly dispersed into the coating suspension with a shear mixer.

A Melinex® 329/500 white PET (125 µm, Du Pont-Teijin) film was corona-treated up to 60 dynes/cm and primed with Dow Chemical Z-6020 silane at a concentration of 2 wt. % and dried at 80° C. for 10 minutes. The white pigmented coating solution was applied to the 125 µm white PET (Melinex® 329) film using a bar coating station. The coating layer was dried at 75° C. for 5 minutes and 130° C. for 2 minutes in a ventilation oven. The acrylic layer formed over the sheet at a coating thickness of 50 µm. The same coating solution was also applied to the backside of the double-sided acrylic coated sheet under the same conditions. The adhesion of the acrylic layers to the silane-primed PET was excellent using a standard cross-hatch peel-off adhesion test. The thermal shrinkage was less than 1.1% at 150° C. for 30 minutes along the MD and TD directions. The optical reflectance at 560 nm was measured at 97.0%. The surface gloss at 60° was reduced to 7-8 GU.

TABLE 11

| Example 11 | Suppliers | Amount (gm) |
| --- | --- | --- |
| Acrylic Resin | Arkema | 76 |
| Core Shell Impact Modifier | Arkema | 24 |
| TiO₂ TI-PURE R-105 Pigment | Du Pont | 235 |
| Tinuvin ® 234 | Ciba | 1.5 |
| Irganox ® 1010 | Ciba | 0.25 |
| Irgafos ® 168 | Ciba | 0.25 |

TABLE 11-continued

| Example 11 | Suppliers | Amount (gm) |
| --- | --- | --- |
| MEK | Aldrich | 360 |
| MIBK | Aldrich | 40 |

Example 12

High Tg acid-functional acrylic block copolymer Nanostrength® MC100 resins (Tg=126° C.) developed by Arkema, France were selected based on the structure of a PBA-b-PMMA-b-PMAA triblock copolymer. UV stabilizer (Tinuvin® 234) and antioxidants (Irganox® 1010 and Irgafos® 126) were added into the formulation during the compounding. The compounded acrylic pellets were dried at 70° C. They were then dissolved in a MEK/butyl acetate (90/10) mixture to form a uniform polymer solution on a roller mixer at room temperature overnight. TiO₂ TI-PURE R-105 pigment particles (with a particle size of ~300 nm) from Du Pont and BaSO₄ particles (BF-grade, having a particle size of ~700 nm) from Cimbar were directly dispersed into the coating suspension with a shear mixer.

The white pigmented coating solution was further applied to a primed Skyrol® SH81 (100 µm, SKC Inc.) PET film substrate using a bar coating station. The coating layer was dried at 75° C. for 5 minutes and 125° C. for 2 minutes in a ventilation oven. The acrylic layer formed over the sheet at a coating thickness of 50 µm. The same coating solution was also applied to the backside of the double-sided acrylic coated sheet under the same conditions. The adhesion of the acrylic layers to the primed PET was excellent. The optical reflectance at 560 nm was measured at 97.1%. The surface gloss at 60° was reduced to 8-10 GU.

TABLE 12

| Example 12 | Suppliers | Amount (gm) |
| --- | --- | --- |
| Triblock copolymer MC100 | Arkema | 100 |
| TiO₂ TI-PURE R-105 Pigment | Du Pont | 185 |
| BaSO₄ BF-grade | Cimbar | 20 |
| Tinuvin ® 234 | Ciba | 2.0 |
| Irganox ® 1010 | Ciba | 0.30 |
| Irgafos ® 126 | Ciba | 0.20 |
| MEK | Aldrich | 360 |
| Butyl acetate | Aldrich | 40 |

Example 13

High Tg acid-functional acrylic Plexiglas® resins (Tg=125° C.) made at Arkema were compounded with core-shell impact modifiers to form impact acrylic resins using a twin-screw extruder at a die temperature of 245° C. UV stabilizer and anti-oxidants were added into the formulation during the compounding. The compounded acrylic pellets were dried at 80° C. They were then dissolved in a MEK/MIBK (9/1) mixture to form a uniform polymer solution at room temperature. 0.6 um cross-linked Celocor® hollow particles (from Arkema Coating Resins) and TiO₂ TI-PURE R-105 pigment particles were directly dispersed into the coating through a roller shear mixer.

The white pigmented coating solution was applied to a chromate Al panel substrate (0.64 mm thick A-412 Q-panel, from Q-Lab Corp.) on a bar coating station. The coating layer was dried at 70° C. for 5 minutes and 124° C. for 2 minutes. The acrylic-coated Al panel formed at a dry coating thickness of 70 µm. The adhesion of acrylic layers to the chromate Al panel was excellent with the square retention of 100% using a standard X-hatch peel-off test. The optical reflectance at 560 nm was measured at 96.8%. The surface gloss at 60° setting was measured at 8 GU.

TABLE 13

| Example 13 | Suppliers | Amount (gm) |
|---|---|---|
| Acrylic Resin | Arkema | 75 |
| Core-Shell Impact Modifier | Arkema | 25 |
| Celocor ® 0.6 um hollow particle | Arkema | 15 |
| TiO$_2$ TI-PURE R-105 Pigment | Du Pont | 185 |
| Tinuvin ® 234 | Ciba | 1.5 |
| Irganox ® 1010 | Ciba | 0.30 |
| Irgafos ® 126 | Ciba | 0.20 |
| MEK | Aldrich | 330 |
| MIBK | Aldrich | 36 |

Example 14

High Tg acid-functional acrylic Plexiglas® HT121 resins (Tg=125° C.) made at Arkema were compounded with core-shell impact modifiers having a particle size of 250-300 nm to form impact acrylic resins using a twin-screw extruder at the die temperature of 245° C. UV stabilizer and anti-oxidants were added into the formulation during the compounding. The compounded acrylic pellets were dried at 90° C. They were then dissolved in a MEK/MIBK (90/10) mixture to form a uniform polymer solution on a roller mixer at room temperature overnight. TiO$_2$ TI-PURE R-105 pigment particles (from Du Pont and BaSO$_4$ particles (BF-grade) from Cimbar were directly dispersed into the coating suspension with a roller shear mixer.

A 0.8 mm Zinc Hot Dip Galvanized Unexposed steel panel (HDG70G70U) from ACT was cleaned up with MEK (Aldrich). The clean steel panel was primed with a 2-component epoxy primer [including Tri(Dimethylaminomethyl) phenol, Tris(dimethylaminomethyl)phenol/epoxy resin] from Elmer's Super Fast Epoxy Cement at the thickness of 10 um and dried at 80° C. for 2 hours. The white pigmented coating solution was applied to the dried epoxy primed steel panel on a bar coating station. The coating layer was dried at 75° C. for 5 minutes and 122° C. for 2 minutes in a ventilation oven. The acrylic layer formed over the sheet at a coating thickness of 60 μm. The adhesion of the acrylic layers to the epoxy-primed steel substrate was excellent with the square retention of 95%-100% using a standard cross-hatch peel-off adhesion test. The optical reflectance at 560 nm was measured at 96.2%. The surface gloss at 60° was reduced to 10 GU.

TABLE 14

| Example 14 | Suppliers | Amount (gm) |
|---|---|---|
| Acrylic Resin | Arkema | 70 |
| Core Shell Impact Modifier | Arkema | 30 |
| TiO$_2$ TI-PURE R-105 Pigment | Du Pont | 204 |
| BaSO$_4$ BF-grade | Cimbar | 16 |
| Tinuvin ® 234 | Ciba | 1.5 |
| Irganox ® 1010 | Ciba | 0.35 |
| Irgafos ® 126 | Ciba | 0.15 |
| MEK | Aldrich | 350 |
| MIBK | Aldrich | 38 |

The adhesion of acrylic layers to the PET films or metal panel substrates was evaluated with a Permacel tape at the angle of near 180 degrees using a standard cross-hatch peel-off adhesion test (ATSM D3002/3359).

The thermal shrinkage was measured with a precision ruler after the samples were exposed at 150° C. for 30 minutes and cooled down to room temperature along the MD and TD directions.

The optical reflectance of the optical reflection film was measured in a reflection mode using Perkin Elmer Lambda 950 with a 150 mm integrating sphere. The instrument was calibrated with a certified reflectance standard (Spetralon, R %=99%).

The film thickness was measured with a Mitutoyo micrometer.

The surface gloss of the optical reflection film was measured at the measuring angle of 60 degrees using a BYK Spectro-Guide or a BYK Micro-Tri-Gloss Meter.

What is claimed is:

1. An optical reflector device comprising:
   1) at least one light emitting diode (LED), and
   2) a film as an optical reflector of the LED light, comprising:
      a) a substrate film layer comprised of a thermoplastic polymer or a metal sheet; and
      b) an acrylic coating on at least one side of the substrate film layer, wherein the acrylic coating is comprised of an acrylic polymer wherein said acrylic polymer has a Tg of at least 110° C., 1 to 30% by weight of one or more matting agents having an average particle size of greater than 400 nm, and from 55 to 90 weight percent of one or more white pigments having an average particle size of from 50 to 400 nm,
      wherein said film has an optical reflectance of at least 96% at 560 nm, and a surface gloss at a measuring angle of 60 degrees of less than 10 GU.

2. The optical reflector device of claim 1, wherein said matting agents are selected from the group consisting of barium sulfate particles, aluminum oxide particles, silicon oxide particles, organic porous particles, hollow particles, and fluoropolymers.

3. The optical reflector device of claim 1, wherein the white pigment is selected from the group consisting of titanium dioxide and barium sulfate.

4. The optical reflector device of claim 1, wherein a first acrylic coating is present on a first side of the substrate film layer and a second acrylic coating is present on a second side of the substrate film layer, with the first acrylic coating and the second acrylic coating being the same as or different from each other.

5. The optical reflector device of claim 1, wherein the acrylic polymer is impact modified.

6. The optical reflector device of claim 1, wherein the acrylic polymer has a Tg of at least 120° C.

7. The optical reflector device of claim 1, wherein the acrylic polymer contains acid functional groups.

8. The optical reflector device of claim 1, wherein the plastic substrate film layer has a thickness of from 25 to 254 μm.

9. The optical reflector device of claim 1, wherein the metal substrate has a thickness of from 0.2 to 1 mm.

10. The optical reflector device of claim 1, wherein the side of the substrate film layer on which the acrylic coating is present is primed.

11. The optical reflector device of claim 1, wherein the acrylic coating has a thickness of 20 to 70 μm.

12. The optical reflector device of claim 1, wherein the substrate film layer is comprised of a thermoplastic polymer selected from the group consisting of PET, PEN, PET-co-PEN, PET-co-PETG, PC, PMMA, ASA, ABS, HIPS, polyolefins and functional polyolefins.

13. The optical reflector device of claim 1, wherein the substarte is comprised of a metal sheet selected from the group consisting of surface treated aluminum and surface treated steel.

14. The optical reflector device of claim 1, wherein the acrylic coating is additionally comprised of a core-shell impact modifier.

15. The optical reflector device of claim 1, wherein the substrate film layer is clear and an acrylic coating is present on both sides of the substrate film layer.

16. The optical reflector device of claim 1, wherein said device comprises a LED backlit unit in an LCD display and said film.

17. The optical reflector device of claim 1, wherein said device comprises a lighting device comprised of a light emitting diode, an organic light emitting diode or a CCFL, and said film in accordance with claim 1.

* * * * *